United States Patent [19]

Mohr et al.

[11] Patent Number: 4,965,334
[45] Date of Patent: Oct. 23, 1990

[54] COPOLYMERS OF POLYSILYL COMPOUNDS AND ANTI-GELLING AGENTS

[75] Inventors: Paul H. Mohr, Chappaqua; Enrico J. Pepe, Amawalk, both of N.Y.

[73] Assignee: First Brands Corporation, Danbury, Conn.

[21] Appl. No.: 229,698

[22] Filed: Aug. 5, 1988

Related U.S. Application Data

[62] Division of Ser. No. 893,803, Aug. 6, 1986, Pat. No. 4,775,415.

[51] Int. Cl.$^5$ ............................................. C08G 77/04
[52] U.S. Cl. ......................................... 528/34; 528/10; 528/33; 528/35; 525/477; 556/431
[58] Field of Search ................... 528/10, 34, 30, 35, 528/33; 525/477; 556/431

[56] References Cited

U.S. PATENT DOCUMENTS

| | | | |
|---|---|---|---|
| 2,418,935 | 4/1947 | Hutchinson | 106/14.05 |
| 2,834,736 | 5/1958 | Kaufman | 252/78.3 |
| 2,875,177 | 2/1959 | Bluestein | 528/34 |
| 3,087,909 | 4/1963 | Morehouse et al. | 528/34 |
| 3,154,431 | 10/1964 | Santelli | 556/435 |
| 3,234,144 | 2/1966 | Morehouse | 252/389 |
| 3,337,496 | 8/1967 | Pines et al. | 252/389 |
| 3,341,469 | 9/1967 | Pines et al. | 252/389 |
| 3,600,418 | 8/1971 | Baily et al. | 257/78.3 |
| 3,691,206 | 9/1972 | Northrup | 525/477 |
| 4,292,434 | 9/1981 | Linder et al. | 556/479 |
| 4,311,626 | 1/1982 | Ona et al. | 525/477 |
| 4,402,847 | 9/1983 | Wilson et al. | 252/75 |
| 4,406,807 | 9/1983 | Renner et al. | 252/78.3 |
| 4,514,315 | 4/1985 | Matulewicz | 252/75 |
| 4,562,237 | 12/1985 | Okuno et al. | 528/34 |
| 4,618,688 | 10/1986 | DePasquale et al. | 106/14.05 |
| 4,684,475 | 8/1987 | Matulewicz | 252/75 |
| 4,775,415 | 10/1988 | Mohr et al. | 556/435 |

OTHER PUBLICATIONS

"Synthesis of Bis(Trichlorosilyl) Ethanes," Marciniec et al., Synth. React Inorganic Met. Org. Chem., 12(2) 139-147 (1982) pp. 139-147.

Homogeneous Catalysts of Hydrosilation by Transition Metals, Speier, J. L. Adv. in Organometallic Chem., vol. 17, pp. 407-447.

*Primary Examiner*—Melvyn I. Marquis
*Attorney, Agent, or Firm*—Gary L. Wamer

[57] ABSTRACT

An alcohol-based composition inhibited against high temperature aluminum cavitation erosion corrosion characterized by the presence of a polysilyl compound of the formula:

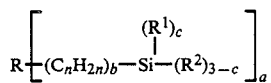

wherein R is a substituted or unsubstituted organic radical; $R^1$ is selected from the group consisting of hydrogen, monovalent hydrocarbon radicals and substituted monovalent hydrocarbon radicals; $R^2$ is a monovalent moiety hydrolyzable to a hydroxyl group, each $R^2$ being the same or different; a is an integer from 2 to 4, inclusive; b is an integer having a value of 0 or 1; n is an integer from 1 to 36, inclusive; and c is an integer having a value of 0 or 1; each

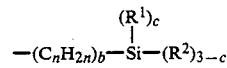

group being the same or different, with the proviso that the compound have at least one

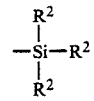

group.

14 Claims, No Drawings

COPOLYMERS OF POLYSILYL COMPOUNDS AND ANTI-GELLING AGENTS

This application is a division of prior U.S. application Ser. No. 893,803 filing date, Aug. 6, 1986, now U.S. Pat. No. 4,775,415.

This invention relates to the use of polysilyl compounds as aluminum corrosion inhibitors in alcohol-based compositions such as antifreezes.

BACKGROUND OF THE INVENTION

Heat exchange systems, such as are associated with internal combustion engines, typically employ as a heat transfer medium an aqueous alcohol solution having one or more additives capable of protecting metal components in contact with same from corrosive attack.

Owing to the increasing use of aluminum in engine cooling systems it is essential that the heat transfer fluids employed therein adequately inhibit corrosive attack on this material. It is particularly desirable that such fluids protect aluminum against the type of corrosion known as "cavitation erosion corrosion" (C/E/C) which occurs at heat rejecting surfaces of a system such as the exhaust port areas of cylinder heads. The products of aluminum cavitation erosion corrosion ultimately form deposits, the accumulation of which can significantly impair a coolant system's heat transfer ability. Not infrequently, an additive's ability to inhibit aluminum corrosion under more moderate conditions will not be determinative of its ability to provide protection in the high temperature environment associated with C/E/C.

The use of silicon-containing additives as corrosion inhibitors in alcohol based compositions, such as antifreezes, is well known in the art. For example, U.S. Pat. No. 3,234,144, to Morehouse et al., discloses the use of organo-functional compounds including hydrocarbonoxysilanes and siloxanes as corrosion inhibitors in antifreeze compositions.

Similarly, U.S. Pat. Nos. 3,337,496 and 3,341,469, both to Pines et al., disclose the use of copolymers of at least one siloxane group and at least one silicate group as additives to inhibit the corrosion of metals in contact with aqueous liquids. As a further illustration, U.S. Pat. No. 4,514,315, to Matulewicz et al., discloses the use of an alkylene silane grafted polyether, comprising the reaction product of an unsaturated grafting silane and a base polyether, as an aluminum corrosion inhibiting additive in aqueous or alcohol solutions.

Notwithstanding the prior art's disclosure of the utility of silicon-containing compounds as corrosion inhibitors, it is well known that not all silicon-containing compounds will afford protection against aluminum corrosion. In fact, many silanes have a tendency to promote aluminum corrosion, particularly under high temperature conditions. U.S. Pat. No. 4,514,315 discloses that under conditions of nucleate boiling, a polyalkylene oxide polymer grafted with vinyltrimethoxysilane provided an aqueous solution of ethylene glycol with excellent protection against aluminum corrosion, whereas, vinyltrimethoxysilane alone was found to contribute to the solution's corrosive effect (see Table II of U.S. Pat. No. 4,514,315).

It is an aspect of this invention to provide an alcohol-based composition inhibited against aluminum corrosion, particularly, aluminum cavitation erosion corrosion.

SUMMARY OF THE INVENTION

In one embodiment this invention is directed to a composition inhibited against high temperature aluminum cavitation erosion-corrosion comprising:
(a) an alcohol; and
(b) a polysilyl compound of the formula:

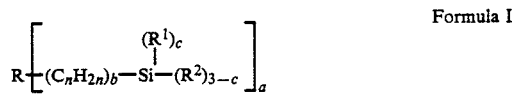

Formula I wherein R is a substituted or unsubstituted organic radical; $R^1$ is selected from the group consisting of hydrogen, monovalent hydrocarbon radicals and substituted monovalent hydrocarbon radicals; $R^2$ is a monovalent moiety hydrolyzable to a hydroxyl group, each $R^2$ being the same or different; a is an integer from 2 to 4 inclusive; b is an integer having a value of 0 or 1; n is an integer from 1 to 36 inclusive; and c is an integer having a value of 0 or 1; each

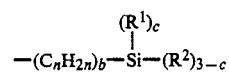

group being the same or different, with the proviso that the compound have at least one

group. Preferably, when R is other than a hydrocarbon radical b is 1 and n is at least 2 for each value of a.

In a further embodiment this invention is directed to a silicate-free composition comprising an alcohol and an effective amount of a Formula I polysilyl compound, as previously described, to protect aluminum surfaces in contact with the composition from high temperature cavitation erosion corrosion.

This invention is further directed to a copolymer formed by the reaction of
(a) a Formula I polysilyl compound as previously defined; and
(b) an anti-gelling agent.

DETAILED DESCRIPTION OF THE INVENTION

As used herein the term "alcohol" includes monohydric alcohols such as methanol and ethanol; glycols such as ethylene glycol, diethylene glycol, propylene glycol and dipropylene glycol; glycol monoethers such as the methyl, ethyl, propyl and butyl ethers of ethylene glycol, diethylene glycol, propylene glycol and dipropylene glycol; glycol diethers such as the methyl and ethyl diethers of ethylene glycol, diethylene glycol and dipropylene glycol; and mixtures thereof, with ethylene glycol, diethylene glycol, propylene glycol, dipropylene glycol and mixtures thereof being preferred.

The Formula I compounds of this invention include polysilyl structures wherein R represents a substituted or unsubstituted bi-, tri- or tetravalent organic moiety. Illustrative of useful organic moieties are hydrocarbon, hydrocarbyloxy, amino, and isocyanurate radicals.

Illustrative of useful hydrocarbon radicals are normal and branched $C_1$ to $C_{36}$ alkylene radicals, such as, for example: —CH$_2$—, —CH$_2$CH$_2$—, —CH(CH$_3$)—, —CH$_2$CH$_2$CH$_2$—, —CH$_2$CH(CH$_3$)—, —(CH$_2$)$_4$—, —CH$_2$CH$_2$CH(CH$_3$)—, —CH$_2$CH(C$_2$H$_5$)—, —CH$_2$CH$_2$CH(CH$_3$)CH$_2$—, —CH$_2$CH$_2$C(CH$_3$)$_2$—, —(CH$_2$)$_{18}$—, —(CH$_2$)$_{16}$CH(CH$_3$)—, and the like; $C_5$ to $C_{12}$ cycloalkylene radicals, such as for example,

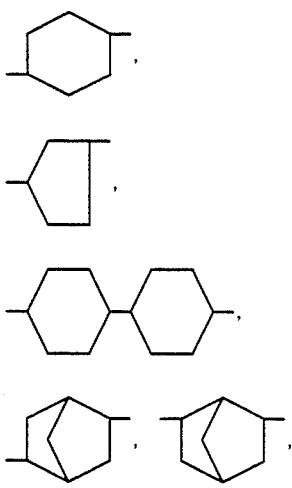

and the like; $C_6$ to $C_{14}$ arylene radicals, such as, for example

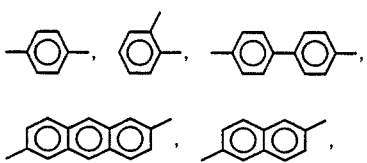

and the like; tri and tetra valent radicals of $C_3$ to $C_{36}$ aliphatic hydrocarbons such as, for example,

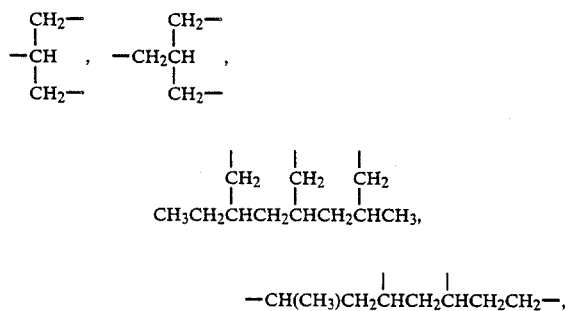

and the like; and tri- and tetravalent radicals of $C_6$ to $C_{14}$ cycloaliphatic and aromatic hydrocarbons such as, for example

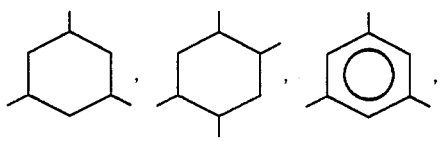

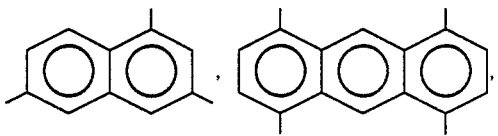

and the like;

For purposes of this invention, preferred hydrocarbon radicals include 2-methylbutylene, ortho- and para-phenylene, and, most preferably, ethylene.

Hydrocarbyloxy radicals as defined herein include radicals of the formula:

$$—(OC_mH_{2m})_d—O—  \qquad \text{Formula II}$$

wherein m is an integer from 2 to 4, inclusive, and d is an integer from 1 to 50, inclusive, wherein for each value of d, m may be the same or different. Repeating units defined by the expression —(OC$_m$H$_{2m}$)— include: —(OCH$_2$CH$_2$)—, —(OCH$_2$CH$_2$CH$_2$)—, —(OCH$_2$CH(CH$_3$))—, —(O(CH$_2$)$_4$)—, —(O(CH)$_2$CHCH$_3$)—, —(OCH(CH$_3$)CH$_2$CH$_2$)— and the like.

For purposes of this invention preferred hydrocarbyloxy radicals have molecular weights of from about 100 to about 600 and comprise repeating units of —(OCH$_2$CH$_2$)—, —(OCH$_2$CH(CH$_3$))—, or mixtures thereof.

As used herein amino radicals include bi, tri and tetravalent radicals represented by the formula:

$$(R^4)_w—\underset{\underset{(R^5)_x}{|}}{N}—\left[R^3—\underset{\underset{(R^6)_y}{|}}{N}—\right]_r(R^7)_z \qquad \text{Formula III}$$

wherein $R^4$, $R^5$, $R^6$ and $R^7$ are selected from the group consisting of hydrogen and monovalent substituted and unsubstituted organic radicals; $R^3$ is a bivalent hydrocarbon radical having 2 to 6 carbon atoms; w, x, y and z are integers independently having values of 0 or 1, and r is an integer from 0 to 50, inclusive, wherein for each value of r, $R^6$ may be the same or different, with the proviso that the combination of r, w, x, y, and z provides the polysilyl compound defined thereby with 2 to 4 groups of the formula $$—(C_nH_{2n})_b—\underset{\underset{(R^2)_{3-c}}{|}}{\overset{\overset{(R^1)_c}{|}}{Si}}$$

as previously defined. Formula III radicals include the following:

$$—\overset{|}{\underset{|}{N}}—$$

—NH—

—NHC$_2$H$_4$NH—

$$—\overset{|}{N}CH_2CH_2NH_2$$

$$—\overset{|}{N}CH_2CH_2NH(NHC_2H_4)_{20}NHC_2H_4NH_2$$

-continued

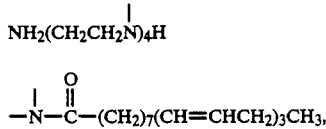

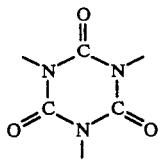

and the like.

Isocyanurate radicals included within the R groups of this invention include radicals represented by the following structure:

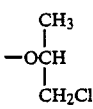

Formula IV

The organic radical R of this invention may be substituted or unsubstituted provided that the resultant polysilyl compound is soluble in the alcohol component of the composition. Suitable substituents include, for example, alkyl, acyl, aryl, aralkyl, alkaryl, hydroxy, polyalkyleneoxy, alkoxy, alkoxypolyalkyleneoxy, acyloxy, acyloxypolyalkyleneoxy, cyano, cyanopolyalkylenoxy, amino, alkamino, dialkylamino, alkanolamino, dialkanolamino, carboxy, carboxy polyalkyleneoxy and carbalkoxy radicals.

R group selection is determined in part by the alcohol component of a given composition. For example, while it may be desirable to employ a Formula I compound wherein R is a relatively small (e.g. $C_1$ to $C_5$) alkylene radical, in an aqueous composition based on ethylene glycol; a Formula I compound wherein R is a relatively long chain hydrocarbyloxy radical may be better suited for use in an anhydrous composition based on propylene glycol.

For purposes of this invention, preferred Formula I compounds include polysilyl compounds wherein R is selected from the group consisting of alkylene, hydrocarbyloxy, and amino radicals.

As used herein, monovalent moieties hydrolyzable to a hydroxyl group include, for example, hydrogen; halogens such as F, Cl, Br and I; hydroxyl radicals; hydrocarbonoxy radicals such as —OCH$_3$, —OCH$_2$CH$_3$, —OCH$_2$CH$_2$OH, —OCH$_2$CH$_2$OCH$_3$, —O(CH$_2$C-H$_2$O)$_2$H, —O(CH$_2$CH$_2$O)$_7$CH$_3$, and the like; oximato groups of the formula

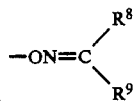

wherein $R^8$ and $R^9$ are monovalent hydrocarbon radicals such as methyl or ethyl; organoamino radicals such as

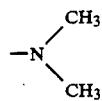

haloalkoxy radicals such as $$-O\underset{\underset{CH_2Cl}{|}}{\overset{\overset{CH_3}{|}}{C}}H$$

and siloxy radicals such as

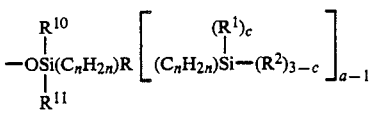

wherein a, b, n, $R^1$, $R^2$, and R are as previously defined, and $R^{10}$ and $R^{11}$ are independently as defined for $R^1$ or $R^2$.

The broad useful class of hydrolyzable moieties would include, for example, acyloxy-containing species, alkyloxy-containing species, aryloxy-containing species, aralkyloxy-containing species, alkaryloxy-containing species, alkyleneoxy-containing species, hydroxy alkyloxy-containing species, hydroxy polyalkyleneoxy alkyloxy-containing species, alkoxy polyalkyleneoxy alkyloxy-containing species, acyloxy polyalkyleneoxy alkyloxy-containing species, alkoxy alkyloxy-containing species, acyloxy alkyloxy-containing species, cyano alkyloxy-containing species, cyano polyalkyleneoxy alkyloxy-containing species, amino alkyloxy-containing species, dialkylamino alkyloxy-containing species, alkanolamino alkyloxy-containing species, dialkanolamino alkyloxy-containing species, carboxy alkyloxy-containing species, carboxy polyalkyleneoxy alkyloxy-containing species, carboalkoxy-containing species and carboalkoxy alkyloxy-containing species. The combination of hydrolyzable moieties selected for use herein should be such as to provide a compound which is soluble in the alcohol component of the composition in which it is employed. Hydrocarbonoxy groups, particularly methoxy groups, are found to be especially well suited to the practice of this invention.

The preparation of the polysilyl compounds employed in the practice of this invention is well known in the art, various procedures being exemplified by the following: U.S. Pat. Nos. 4,292,434, 4,448,694 and 3,329,698 as well as in Marciniec et al., "Synthesis of Bis(trichlorosilyl) Ethanes Via Hydrosilylation," Synth. React. Inorg. Met.-Org. Chem., vol 12, no. 2, pp. 139–147, (1982), and J. L. Speir "Homogeneous Catalysis of Hydrosilation by Transition Metals", Adv. Organomet, Chem., Vol. 17, pp. 407–447, (1979). For example, bis-silyl alkanes may be prepared by the platinum catalyzed hydrosilylation of an olefinic silane with trichlorosilane. Similarly, the platinum catalyzed hydrosilylation of allyl ether terminated polyalkylene oxides with trichlorosilane may be used, for example, to produce Formula I bis-(trichlorosilyl) polyalkylene oxides. Further, polysilyl compounds wherein R is an arylene or alkyl substituted arylene radical may be produced by the aluminum catalyzed alkylation of an aromatic compound such as benzene, toluene and the like with an olefinic chlorosilane, whereas, bis-silylnorbornanes may be synthesized by the Diels-Alder reaction of vinylsilane with cyclopentadiene. Further, as disclosed in U.S. Pat. No. 4,448,694, a Formula I bis-silyl amine may be prepared by reacting a selected polyamine precursor such as, for example, diethylenetriamine, triethylenetetramine or tetraethylenepentamine with a haloalkylsilane ester, such as, for example, 3-chloropropyl trimethoxysilane. Polysilyl compounds produced as described above may be converted to their corresponding esters by subsequent reaction with methanol or ethanol.

The composition of this invention are available as concentrates which may contain up to about 10 percent by weight, based on the total weight of the concentrate, of water, and generally contain water in amount of from about 2 to about 8 percent by weight, based on the total weight of the concentrate. In use as an antifreeze, the concentrate is generally diluted with from about 30 to about 70, preferably from about 40 to about 60, parts by volume of water. This invention further contemplates the use of concentrates as well as anhydrous compositions as working antifreeze compositions. Thus, while current practice may be to dilute a concentrate with water to form a working antifreeze, concentrate dilution is not considered essential to the practice of this invention.

In order to achieve effective corrosion protection, particularly aluminum C/E/C protection, the concentrates of this invention are generally provided with a sufficient amount of a polysilyl compound to provide from about 20 ppm weight to about 1,000 ppm by weight, preferably about 35 ppm by weight to about 600 ppm by weight of what is herein termed "active silicon". For purposes of this invention "active silicon" is defined as silicon capable of providing corrosion protection to aluminum. As a rule of thumb, per hydrolyzed molecule, the bis, tris and tetrakis compounds of this invention are each deemed to contain one active silicon.

Upon dilution, concentrates containing less than about 20 ppm by weight of active silicon are generally unable to provide aluminum with effective protection against C/E/C corrosion. Conversely, concentrates containing in excess of about 1000 ppm by weight of active silicon are frequently too expensive to provide a commercially attractive product. It should be appreciated that when, in addition to the above described Formula I compound, a composition further comprises one or more conventional silicate inhibitors, the corrosion inhibiting efficacy of such compositions may be maintained at reduced Formula I compound concentrations.

Conventional silicate inhibitors which may be added to the compositions of this invention include, for example, inorganic silicates of the formula:

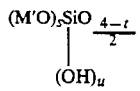

wherein M' is a monovalent cation that forms a glycol soluble silicate and is selected from the group consisting of sodium, potassium, lithium, rubidium and tetraorganoammonium cations, s has a value of from 1 to 4 inclusive, u has a value from 0 to 3 inclusive and t has a value from 1 to 4 inclusive which is the sum of s and u; and/or organic silicate esters of the formula $Si(OR^{14})_4$ wherein $R^{14}$ is selected from the group consisting of alkyl, aryl, alkoxyaryl, and hydroxyalkoxy radicals, and mixtures thereof.

The polysilyl compounds of this invention are termed "silicate mimics" owing to their ability to provide aluminum with C/E/C protection similar to that provided by silicate inhibitors. Further, like silicates, the polysilyl compounds of this invention have a tendency to hydrolyze and for the resulting silanols to condense to higher molecular weight species, ultimately polymerizing into gels. Gel formation reduces the quantity of polysilyl compound available as an inhibitor, thereby reducing the corrosion inhibiting efficacy of a solution. Accordingly, it is generally desirable to stabilize the compositions of this invention by the addition thereto of one or more conventional anti-gelling agents.

Included among the anti-gelling agents suitable for use in the practice of this invention are:

(a) compounds of the formula:

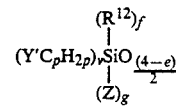

where Y' represents a monovalent organofunctional moiety selected from the group consisting of polyethyleneoxy-containing species, hydroxy-containing species, saponified carboxy-containing species, saponified carboxypolyalkyleneoxy-containing species, saponified phosphate and phosphate ester-containing species, saponified sulfonate-containing species, and mixtures thereof; p is an integer having a value from 1 to 20 inclusive, v is an integer having a value from 1 to 3 inclusive; f is an integer having a value from 0 to 2 inclusive; g is an integer having a value from 0 to 3 inclusive; and e is an integer having a value from 1 to 4 inclusive, the value of e being equal to the sum of v, f and g; $R^{12}$ is a monovalent hydrocarbon radical free of olefinic unsaturation, Z is a hydrolyzable moiety attached to silicon, consisting of at least one member selected from the group consisting of $-OR^{13}$ and $-NR^{13}$, wherein $R^{13}$ may be the same or different species selected from the group consisting of hydrogen, monovalent hydrocarbon radicals, and substituted monovalent hydrocarbon radicals including, for example, acyl-containing species, alkyl-containing species, aryl-containing species, aralkyl-containing species, alkaryl-containing species, alkylene-containing species, hydroxy alkyl-containing species, hydroxy polyalkyleneoxy alkyl-containing species, alkoxy polyalkyleneoxy alkyl-containing species, acyloxy polyalkyleneoxy alkyl-containing species, alkoxy alkyl-containing species, acyloxy alkyl-containing species, cyano alkyl-containing species, cyano polyalkyleneoxy alkyl-containing species, amino alkyl-containing species, alkylamino alkyl-containing species, dialkylamino alkyl-containing species, alkanolamino alkyl-containing species, dialkanolamino alkyl-containing species, carboxy alkyl-containing species, carboxy polyalkyleneoxy alkyl-containing species, carboalkoxy-containing species and carboalkoxy alkyl-containing species.

The organosilanes described in U.S. Pat. No. 3,341,469; the organosiloxanes described in U.S. Pat. No. 4,485,025; the sulfonates described in U.S. Pat. Nos. 4,333,843 and 4,367,154; the phosphonates described in U.S. Pat. No. 4,548,733; and the carboxy substituted organosilicon compounds described in U.S. Application Ser. No. 855,379 filed on Apr. 24, 1986, in the name of Paul Herman Mohr and Enrico James Pepe, all incorporated herein by reference, are representative of several classes of organosilicon compounds having utility as anti-gelling agents.

For purposes of this invention preferred anti-gelling agents are polyalkyleneoxy silanes, alkali metal carbonoxy organosilanes and alkali metal phosphonoxy organosilanes.

The quantity of anti-gelling agent added to the compositions of this invention is subject to variation depending upon factors which include anti-gelling agent efficiency, polysilyl compound concentration, pH, the influence of other composition additives, economic considerations and the like.

Anti-gelling agent concentrations in a concentrate may, therefore, range from quantities as low as about 5 ppm by weight on an equivalent Si basis to concentrations in excess of about 500 ppm by weight on an equivalent Si basis. The amount of anti-gelling agent effective in providing a required degree of gelation resistance may, however, be readily determined by means of relatively simple accelerated aging tests. In such tests, a sample quantity of a particular composition is maintained at a selected elevated temperature and the time period before gel formation measured, the correlation between room temperature and the selected elevated temperature having been previously determined by a comparison of aging data. See, for example, U.S. Pat. No. 4,149,985, for exemplification of an accelerated aging test.

As a general rule, a composition is effectively inhibited against gel formation when the mole ratio of anti-gelling agent to corrosion inhibitor, on an equivalent to active Si basis, ranges from about 1:20 to about 1:5 and preferably is about 1:10.

As will be appreciated, the polysilyl compounds of this invention are capable of reacting with the above-described anti-gelling agents to form, as generally termed in the art, copolymers.

The copolymers useful in the present invention can be pre-formed prior to formulation of the alcohol-containing compositions of this invention, or they can be formed in situ by mixing a polysilyl compound with an organosilicon anti-gelling agent in the presence of an alcohol. Suitable processes for producing the copolymers of this invention are well-known in the art and are disclosed, for example, in U.S. Pat. Nos. 3,337,496 and 3,312,622 both incorporated herein by reference.

The compositions of this invention may further comprise one or more buffers. In general, the concentrates of this invention are buffered to a pH of from about 7 to about 11, preferably from about 8.5 to about 10.5. The particular buffer or mixture of buffers employed will depend upon the pH desired in a given application which, in turn, may be influenced by the particular metals anticipated to be in contact with the compositions. For example, it is generally desirable to provide a working antifreeze comprising 50 volume percent of concentrate and 50 volume percent of water with a pH of from about 8 to about 11. Below a pH of about 8, the working antifreeze would generally be expected to be unduly corrosive toward ferrous metals, whereas, at a pH in excess of about 11, the working antifreeze would be expected to promote aluminum corrosion.

Included among the buffers suitable for use herein are ammonium, alkanolamine and alkali metal borates, tetraalkyl and tetraaryl-ammonium borates, and mixtures thereof; alkali metal phosphates; ammonium phosphates, alkanolamine phosphates, tetraalkyl- and tetraaryl-ammonium phosphates, and mixtures thereof; alkali metal, ammonium, and alkanolamine carbonates and/or bicarbonates, and mixtures thereof; alkali metal, ammonium, and amine benzoates and substituted benzoates and mixtures thereof; salts of the dibasic acids, such as sebacic and azelaic acids, having 6 to 20 carbons, and mixtures thereof; and mixtures of any of the above buffers; said buffer generally being present in an amount of between 1 and about 5 wt. percent, based on the weight of the concentrate.

Among the useful buffers identified, a phosphate, borate or mixture thereof is the preferred buffer and may be conveniently added to the composition as an alkali metal salt. After adding the salt, addition of sodium hydroxide or potassium hydroxide can be used to provide the composition with the desired meta and/or tetra borates and/or phosphates.

In addition to aluminum, the cooling systems of internal combustion engines may contain components fabricated from other metals such as, for example ferrous and cuprous metals. Accordingly, the compositions of this invention may further comprise supplementary corrosion inhibitors to protect metal surfaces other than aluminum. Supplementary corrosion inhibiting additives include, for example, molybdates, tungstates, selenates, chromates, borates, organophosphates, carbonates, bicarbonates, sebacates and other dicarboxylic acids, benzoates, hydroxy benzoates or acids thereof, acrylic acid polymers and graft copolymers thereof, alkali metal nitrates, alkali metal nitrites, tolytriazole, mercaptobenzothiazole, benzotriazole, and the like, and mixtures thereof.

Preferred supplementary corrosion inhibitors include molybdates, dicarboxylic acids, alkali metal nitrates, alkali metal nitrites and totyltriazole.

The quantity of supplementary corrosion inhibitor additive employed should be sufficient to measurably inhibit corrosion of cooling system surfaces other than aluminum. The sum total of inhibitor capable of providing such protection being herein referred to as an "inhibitory effective amount". Typically, the total amount of all such supplementary corrosion inhibitor additives will not exceed 10 weight percent of the total weight of a composition concentrate.

The compositions of this invention may further comprise one or more optional additives including lubricants, and antifoam agents, such as polysiloxanes and polyalkylene oxides; wetting agents and surfactants, such as the poly(oxyalkylene) adducts of fatty alcohols; dyes; and other ingredients known in the art which do not adversely effect the aluminum corrosion resistance sought to be achieved.

In a preferred embodiment the composition of this invention is a concentrate comprising from about 92 to about 96 percent by weight of an alcohol, preferably ethylene glycol or mixtures of ethylene glycol and diethylene glycol, from about 100 ppm by weight, on an active Si basis, to about 500 ppm by weight, on an active Si basis, of a bis-silyl compound, preferably 1,2-bis(-trimethoxysilyl) ethane, from about 10 ppm by weight to about 50 ppm by weight, on an equivalent Si basis, of anti-gelling agent, preferably a polyalkyleneoxy silane, most preferably a 3-(methoxypolyethyleneoxy) propyl trimethoxy silane, from about 1 to about 5 percent by weight of an alkali metal phosphate and/or borate buffer and a balance of water.

EXAMPLES

The following examples are intended to illustrate without in any way limiting the present invention. Unless otherwise indicated, all parts and percentages provided in the Examples and claims are by weight.

EXAMPLE 1

Into a 1 liter, 3-necked reaction flask equipped with a magnetic stirrer, electric heating mantle, dropping funnel, thermometer and dry ice condenser was charged 161.5 grams of vinyltrichlorosilane ($CH_2=CHSiCl_3$) and 25 ppm of platinum as chloroplatinic acid ($H_2PtCl_6.nH_2O$). The catalyst-containing vinyltrichlorosilane was heated to a temperature of 50° C.±1° C. and the dropwise addition thereto of 140.0 grams of trichlorosilane ($HSiCl_3$) commenced. Silane addition took place over a period of one hour during which time the temperature of the reaction flask was maintained at 60° C.±10° C. by the occasional application of a water bath. Thereafter, excess trichlorosilane was removed from the reaction flask by vacuum stripping to a final condition of 100 mm Hg pressure at 70° C. The resulting adduct, was esterified by the subsequent subsurface addition of 288 grams of anhydrous methanol. Methanol was introduced to the adduct over a period of one hour while maintaining a pressure of 125 mm Hg±25 mm Hg and a temperature of 70° C.±10° C. During the esterification reaction gaseous hydrogen chloride by-product was vented through a vacuum pump into a fume hood. The crude esterification product was subsequently neutralized with methanolic sodium methoxide, filtered free of sodium chloride and distilled in a conventional vacuum distillation setup to obtain 256 grams of 99% pure 1,2-bis(tri- methoxy silyl)ethane (($CH_3O)_3SiCH_2CH_2Si(OCH_3)_3$). The assigned structure of the resultant product was verified by $^{13}C$ NMR analysis.

EXAMPLE 2

Into a 1 liter, 3-necked reaction flask equipped with a magnetic stirrer, electric heating mantle, dropping funnel, thermometer and dry-ice condenser was charged 323.0 grams of vinyl trichlorosilane ($CH_2=CHSiCl_3$) 271.0 of trichlorosilane ($HSiCl_3$), and 0.2 grams of tetrakis- triphenylphosphine-palladium-O catalyst. The resultant mixture was then heated to reflux. The mixture was refluxed for a 10 hour period during which time the reflux temperature rose from 49° C. to 125° C. Thereafter excess silane was removed from the reaction flask by vacuum stripping to a final condition of 100 mm Hg pressure at 65° C. The resulting adduct, was esterified by the subsequent subsurface addition of 288 grams of anhydrous methanol, introduced thereto dropwise over a period of two hours while maintaining a pressure of 125 mm Hg±25 mm Hg and a temperature of 75° C.±5° C. During the esterification reaction gaseous hydrogen chloride by-product was vented through a vacuum pump into a fume hood. The crude esterification product was subsequently neutralized with methanolic sodium methoxide, filtered free of sodium chloride and distilled in a conventional vacuum distillation setup to obtain 488.4 grams of 98% pure 1,1-bis(trimethoxysilyl) ethane (($CH_3O)_3 SiCH(CH_3)Si(OCH_3)_3$). $^{13}C$ NMR analysis and gas chromatography verified the assigned structure of the resultant product.

EXAMPLE 3

Into a 1-liter, 3-necked reaction flask equipped with a magnetic stirrer, electric heating mantle, dropping funnel, thermometer, and dry-ice condenser equipped with a dry nitrogen by-pass tube at the exit port thereof, was changed 272.4 grams of isoprene ($CH_2=CH(CH_3)CH=CH_2$) and 0.08 grams of platinum as chloroplatinic acid ($H_2PtCl_6.nH_2O$) dissolved in isopropanol at a concentration of 0.08 grams of platinum per ml of solution. To the catalyst-containing isoprene was added a mixture of 569.1 grams of trichlorosilane ($HSiCl_3$) and 0.6 grams of phenothiazene, dropwise over a period of one hour. Thereafter, the mixture was maintained at ambient temperature over a period of eight days with a second dropwise addition of 0.08 grams of catalyst and 0.6 grams of phenothiazene taking place during this period after an interval of two days. Distillation of the resultant product at atmospheric pressure in a dry nitrogen atmosphere produced 271.6 grams of product.

The product produced by the above described reaction was transferred to a 500 ml, 3-necked flask equipped with a magnetic stirrer, electric heating mantle, subsurface sparge tube and conventional vacuum esterification attachments. Thereafter, 250 grams of anhydrous methanol was introduced thereto over a 3 hour period while maintaining a pressure of 100 mm Hg±20 mm of Hg and a temperature of 70° C.±5° C. During the esterification reaction gaseous hydrogen chloride by-product was vented through the vacuum pump into a fume hood. The crude esterification product was neutralized by the addition thereto of trimethylorthoformate ($HC(OCH_3)_3$), followed by treatment with methanolic sodium methoxide to insure complete neutralization of any residual acidity. The neutralized esterification product was filtered free of sodium chloride and distilled in a conventional vacuum distillation setup to obtain 220.2 grams of 98% pure ($CH_3O)_3$-$SiC_5H_{10}Si(OCH_3)_3$ in various isomeric forms. Gas chromatography and mass spectometry verified the assigned structure of the resultant product.

EXAMPLE 4

Into a 500 ml, 3-necked reaction flask equipped with a magnetic stirrer, electric heating mantle, dropping funnel, thermometer, and dry-ice condenser equipped with a dry-nitrogen by-pass tube at the exit port thereof, was charged 75.9 grams of trichlorosilane ($HSiCl_3$) and 125 ppm of platinum as chloroplatinic acid ($H_2PtCl_6.nH_2O$). The catalyst-containing trichlorosilane was heated to a temperature of 30° C.±2° C. and the dropwise addition thereto of 75.0 grams of triethylene glycol diallyl ether ($CH_2=CHCH_2O(CH_2C-H_2O)_3CH_2CH=CH_2$) commenced. Diallyl ether addition took place over a period of about one hour during which time the temperature of the reaction flask rose to 56° C. Following diallyl ether addition the resultant reaction mixture was refluxed for a period of 30 minutes to a temperature of 72° C. Excess trichlorosilane was thereafter removed from the reaction flask by vacuum stripping to a final condition of 100 mm Hg pressure at 70° C. The resulting product, was esterified by the subsequent addition of 80.6 grams of anhydrous methanol, introduced dropwise thereto over a period of 30 minutes while maintaining a pressure of 125 mm Hg±25 mm Hg and a temperature of 70° C.±10° C. During the esterification reaction gaseous hydrogen chloride by-product was vented through a vacuum pump into a fume hood. The crude esterification product was subsequently neutralized with methanolic sodium methoxide, filtered free of sodium chloride and distilled in conventional vacuum distillation setup to obtain 78.3 grams of 98% pure ($CH_3O)_3SiC_3H_6O(CH_2CH_2O)_3C_3H$-

$_6Si(OCH_3)_3$. $^{13}C$ NMR analysis verified the assigned structure of the resultant product.

EXAMPLE 5

Into a 500 ml, 3-necked reaction flask equipped with a magnetic stirrer, electric heating mantle, dropping funnel, thermometer, and dry-ice condenser was charged 120 grams of the diallyl ether, $CH_2=CHCH_2O(CH_2CH_2O)_{25}CH_2CH=CH_2$ and 25 ppm of platinum as 0.16 ml of chloroplatinic acid ($H_2PtCl_6.nH_2O$) dissolved in isopropanol at a concentration of 0.0187 grams of platinum per ml of solution. The catalyst-containing diallyl ether was heated to a temperature of 50° C.±1° C. and dropwise addition thereto of 29.8 grams of trichlorosilane ($HSiCl_3$) commenced. Silane addition took place over a period of 10 minutes during which time the temperature of the reaction flask rose to about 70° C. Following silane addition the resultant reaction mixture was refluxed for a period of one hour at a temperature of 70° C. Excess trichlorosilane was thereafter removed from the reaction flask by vacuum stripping to a final condition of 100 mm Hg pressure at 75° C. The product was esterified by the subsequent addition of 30 grams of anhydrous methanol, introduced dropwise thereto over a period of twenty minutes while maintaining a pressure of 125 mm Hg±25 mm Hg and a temperature of 70° C.±10° C. During the esterification reaction gaseous hydrogen chloride by-product was vented through a vacuum pump into a fume hood. The crude esterification product was subsequently neutralized with methanolic sodium methoxide, filtered free of sodium chloride and stripped free of volatiles to a final temperature of 80° C. at 1 mm Hg pressure in a conventional vacuum distillation setup to obtain 136 grams of 86% pure $(CH_3O)_3SiC_3H_6O(CH_2CH_2O)_{25}C_3H_6Si(OCH_3)_3$. The assigned structure of the resultant product was verified by $^{13}C$ NMR analysis.

EXAMPLES 6 AND 7

Into a 2 liter, 3-necked reaction flask equipped with a magnetic stirrer, electric heating mantle, dropping funnel and water condenser was charged 716.4 grams of 3-aminopropyl trimethoxysilane ($NH_2(CH_2)_3Si(OCH_3)_3$). The amine was heated to 140° C. and the dropwise addition thereto of 396 grams of 3-chloro propyltrimethoxysilane ($Cl(CH_2)_3Si(OCH_3)_3$) commenced. $Cl(CH_2)_3Si(OCH_3)_3$ was introduced to the reaction flask over a period of 1 hour while maintaining a temperature of 145° C.±10° C. by the occasional application of a water bath. The resultant mixture was held at 145° C.±2° C. for a period of 2 hours and cooled to 75° C. 180 grams of anhydrous ethylene diamine was added to the cooled mixture with stirring. Thereafter, the mixture was allowed to separate into layers with the upper product containing layer being separated therefrom and distilled to recover 145 grams of unreacted $NH_2(CH_2)_3Si(OCH_3)_3$, 400 grams of bis(trimethoxysilyl)propylamine (($CH_3O)_3SiCH_2CH_2CH_2NHCH_2CH_2CH_2Si(OCH_3)_3$), and 415 grams of tris-(trimethoxysilylpropyl)amine (($CH_3O)_3SiCH_2CH_2CH_2)_3N$). Amine titration, gas chromatography and $^{13}C$ NMR analysis verified the assigned structure of the bis-(trimethoxysilyl-propyl)amine and tris-(trimethoxysilylpropyl)amine products.

EXAMPLE 8

A 2 liter, 3-necked reaction flask equipped with a magnetic stirrer, electric heating mantle, dropping funnel and water condenser, containing 22.0 grams of $NH_2CH_2CH_2NH(CH_2)_3Si(OCH_3)_3$ was heated to 140° C. whereupon the addition thereto of 198.0 grams of 3-chloropropyltrimethoxy silane ($Cl(CH_2)_3Si(OCH_3)_3$) was commenced. $Cl(CH_2)_3Si(OCH_3)_3$ was introduced dropwise to the reaction flask over a period of 1 hour while maintaining a temperature of 145° C. to 150° C. by the occasional application of a water bath. The resultant mixture was cooled to 75° C., and 90 grams of anhydrous ethylenediamine was added to the cooled mixture. Thereafter, the mixture was allowed to separate into layers with the upper product containing layer being separated therefrom and stripped by vacuum distillation of low boiling volatiles to yield 370 grams of $(CH_3O)_3SiC_3H_6NHC_2H_4NHC_3H_6Si(OCH_3)_3$. Amine titration and $^{13}C$ NMR and $^{29}Si$ NMR analysis verified the assigned structure of the resultant product.

EXAMPLES 9 TO 25

The aluminum C/E/C resistance provided by various polysilyl compounds to aqueous alcohol solutions was tested by means of the following procedure:

Polysilyl compounds of the formula $(CH_3O)_3SiX-Si(OCH_3)_3$ were added to the base fluids described in Table 1 to provide concentrates having the polysily compound concentration described in Table 2. Thereafter the concentrates were diluted to 33 weight percent aqueous test solutions.

20 ml of test solution was placed inside an aluminum weighing dish 13 mm high, 6 mm in diameter, and 0.11 mm thick having a dimple 7 mm in diameter and 0.13 mm deep pressed into the center of the exterior surface of the dish bottom. The initial solution level was marked on the side of the dish. The filled dish was placed on a fiberglass covered ring and aligned over a rounded soldering iron tip connected to a variable control heat source such that the iron tip was in intimate contact with the dish dimple. Thereafter, a cover glass was placed over the dish and weighted down with a 50 gram mass. The covered dish was heated through the iron tip to a sufficiently high temperature to achieve vigorous visible and audible boiling of the solution at the dimple areas thereof. The dish was thereafter maintained at such heat input until the test solution penetrated the dish. During heating the solution level was maintained at the filled fluid mark by the periodic addition of deionized water. Penetration times for the various test solutions are reported in Table 2. Data for repeat solution trials is separated by a slash. At the expiration of the test, gel formation on the walls and in the dimple area of the test dishes was noted for all solutions diluted from concentrates having polysilyl compound concentrations of 1%.

TABLE 1

| BASE FLUID COMPOSITION | |
|---|---|
| Component | % by weight |
| Ethylene Glycol | 95.8586 |
| $Na_2B_2O_4.8H_2O$ | 3.7813 |
| Sodium mercapto-benzothiazole (as a 50 weight percent aqueous solution) | 0.3601 |

TABLE 2

ALUMINUM C/E/C TEST RESULTS

| Example | % polysilyl compound[1] | x | Penetration Time (Hrs)[2] |
|---|---|---|---|
| 9 | 1.0 | $-C_2H_4-$ | 4 |
| 10 | 0.25 | $-C_2H_4-$ | 7+/7+ |
| 11 | 0.10 | $-C_2H_4-$ | 22/22+ |
| 12 | 1.0 | $-CH(CH_3)-$ | 6/6 |
| 13 | 0.25 | $-CH(CH_3)-$ | 7.2/7.2 |
| 14 | 1.0 | $-C_5H_{10}-$ | 1.4/1.7 |
| 15 | 0.25 | $-C_5H_{10}-$ | 7+/7+ |
| 16 | 1.0 | $-C_3H_6(OC_2H_4)_3OC_3H_6-$ | 2.7/2.7 |
| 17 | 0.25 | $-C_3H_6(OC_2H_4)_3OC_3H_6-$ | 2.7/2.7 |
| 18 | 1.0 | $-C_3H_6(OC_2H_4)_{25}OC_3H_6-$ | 3.3/5.0 |
| 19 | 0.25 | $-C_3H_6(OC_2H_4)_{25}OC_3H_6-$ | 7+/7+ |
| 20 | 1.0 | $-C_3H_6NHC_3H_6-$ | 1.8/1.6 |
| 21 | 1.0 | $-C_3H_6N(C_3H_6Si(OCH_3)_3)C_3H_6-$ | 3.3/2.5 |
| 22 | 0.25 | $-C_3H_6N(C_3H_6Si(OCH_3)_3)C_3H_6-$ | 7+/7+ |
| 23 | 1.0 | $-C_3H_6NHC_2H_4NHC_3H_6-$ | 1.5/1.5 |
| 24 | 0.25 | $-C_3H_6NHC_2H_4NHC_3H_6-$ | 7+/3.7 |
| 25 | 0.10 | $-C_3H_6NHC_2H_4NHC_3H_6-$ | 1.3/1.3 |

[1] Values reported represent weight percentages based on the total weight of the concentrate.
[2] The designation "+" indicates a penetration time in excess of the designation's numerical prefix.

COMPARATIVE EXAMPLE

As a Comparative Example the above-described test procedure was followed for a 33 weight percent aqueous dilution of base fluid. The penetration time for two such solutions were 1.0 hours and 1.3 hours respectively.

EXAMPLES 26 TO 38

Polysilyl compounds of the formula $(CH_3O)_3SiX-Si(OCH_3)_3$ were added to the base fluid described in Table 1 to provide concentrates having the polysilyl concentrations described in Table 3. Additionally, 3-(methoxypolyethyleneoxy) propyl trimethoxy silane, an anti-gelling agent commercially available from Union Carbide Corporation under the product designation Y-5560, was added to each of the test solutions at a concentration 1/10 that of the polysilyl compound on an equivalent to active Si basis. Thereafter the concentrates were diluted to 33 weight percent aqueous test solutions.

The solutions were subjected to the C/E/C test previously described. Penetration times for the various test solutions are reported in Table 3. At the expiration of these tests, the dish walls and dimple areas of the test dishes were noted to be free of gel deposits.

Comparing, for example, Example 10 with Example 26, and Example 15 with Example 29, it is noted that at polysily compound concentrations of 0.25 weight percent in the concentrate, the test solutions containing an anti-gelling agent had shorter penetration times than the compositions lacking such a component. It is believed that this reduction in penetration time is the result of the anti-gelling agent exhibiting a corrosive effect towards aluminum at low corrosion inhibitor concentrations.

TABLE 3

ALUMINUN C/E/C TEST RESULTS

| Example | % polysilyl compound[1] | x | Penetration Time (Hrs)[2] |
|---|---|---|---|
| 26 | 0.25 | $-C_2H_4-$ | 1.0/1.7 |
| 27 | 0.5 | $-C_2H_4-$ | 7+/7+ |
| 28 | 1.0 | $-C_2H_4-$ | 7+/7+ |
| 29 | 0.25 | $-C_5H_{10}-$ | 1.9/1.9 |
| 30 | 1.0 | $-C_5H_{10}-$ | 5+/5+ |
| 31 | 0.25 | $-C_3H_6(C_2H_4O)_3C_3H_6-$ | 2.0/1.0 |
| 32 | 0.5 | $-C_3H_6(C_2H_4O)_3C_3H_6-$ | 7.5/7.5+ |
| 33 | 1.0 | $-C_3H_6(C_2H_4O)_3C_3H_6-$ | 6.3/7.3+ |
| 34 | 0.25 | $-C_3H_6(C_2H_4O)_{25}C_3H_6-$ | 4.5/4.5 |
| 35 | 0.5 | $-C_3H_6(C_2H_4O)_{25}C_3H_6-$ | 6.8/4.5 |
| 36 | 0.25 | $-C_3H_6NHC_2H_4NHC_3H_6-$ | 2.0/2.0 |
| 37 | 0.5 | $-C_3H_6NHC_2H_4NHC_3H_6-$ | 4.6/7.5+ |
| 38 | 1.0 | $-C_3H_6NHC_2H_4NHC_3H_6-$ | 6.3/7.3+ |

[1] Values reported represent weight percentages based on the total weight of the concentrate.
[2] The designation "+" indicates a penetration time in excess of the designation's numerical prefix.

What is claimed is:

1. A copolymer formed by the reaction of
(a) a polysilyl compound of the formula:

$$R\left[-(C_nH_{2n})_b-\underset{(R^2)_{3-c}}{\overset{(R^1)_c}{Si}}\right]_a$$

wherein R is a substituted or unsubstituted organic radical; $R^1$ is selected from the group consisting of hydrogen, monovalent hydrocarbon radicals and substituted monovalent hydrocarbon radicals; $R^2$ is a monovalent moiety hydrolyzable to a hydroxyl group, each $R^2$ being the same or different; a is an integer from 2 to 4, inclusive; b is an integer having a value of 0 or 1; n is an integer from 1 to 36, inclusive; and c is an integer having a value of 0 or 1; each $$-(C_nH_{2n})_b-\underset{(R^2)_{3-c}}{\overset{(R^1)_c}{Si}}-$$

group being the same or different, with the provisio that the compound have at least one $$\underset{R^2}{\overset{R^2}{\underset{|}{-Si-}}}R^2$$

group; and
(b) an anti-gelling agent.

2. A copolymer as defined in claim 1 wherein the anti-gelling agent is a compound of the formula:

$$(Y'C_pH_{2p})_v\underset{(Z)_g}{\overset{(R^{12})_f}{SiO}}_{(\frac{4-e}{2})}$$

where Y' represents a monovalent organofunctional moiety selected from the group consisting of: polyethyleneoxy-containing species, hydroxy-containing species, saponified carboxy-containing species, saponified carboxypolyalkyleneoxy-containing species, saponified phosphate, phosphate ester-containing species, saponified sulfonate-containing species, and mixtures thereof; p is an integer having a value from 1 to 20 inclusive; v is an integer having a value from 1 to 3 inclusive; f is an integer having a value from 0 to 2 inclusive; g is an integer having a value from 0 to 3 inclusive; and e is an integer having a value from 1 to 4 inclusive, the value of e being equal to the sum of v, f and g; $R^{12}$ is a monovalent hydrocarbon radical free of olefinic unsaturation, Z is a hydrolyzable moiety attached to silicon, consisting of at least one member selected from the group consisting of —$OR^{13}$ and —$NR^{13}$, wherein $R^{13}$ may be the same or different species selected from the group consisting of: (1) hydrogen; (2) monovalent hydrocarbon radicals; and (3) substituted monovalent hydrocarbon radicals selected from the group consisting of: acyl-containing species, alkyl-containing species, aryl-containing species, aralkyl-containing species, alkaryl-containing species, alkylene-containing species, hydroxy alkyl-containing species, hydroxy polyalkyleneoxy alkyl-containing species, alkoxy polyalkyleneoxy alkyl-containing species, acyloxy polyalkyleneoxy alkyl-containing species, alkoxy alkyl-containing species, acyloxy alkyl-containing species, cyano alkyl-containing species, cyano polyalkyleneoxy alkyl-containing species, amino alkyl-containing species, alkylamino alkyl-containing species, dialkylamino alkyl-containing species, alkanolamino alkyl-containing species, dialkanolamino alkyl-containing species, carboxy alkyl-containing species, carboxy polyalkyleneoxy alkyl-containing species, carboalkoxy-containing species, and carboalkoxy alkyl-containing species.

3. A copolymer as defined in claim 1 wherein the anti-gelling agent is selected from the group consisting of polyalkyleneoxy silanes, alkali metal carbonoxy organosilanes and alkali metal phosphonoxy organosilanes.

4. A copolymer as defined in claim 3 wherein the organic radical R of the polysilyl compound is a substituted or unsubstituted normal or branched $C_1$ to $C_{36}$ alkylene radical.

5. A composition as defined in claim 1 wherein the organic radical R of said polysilyl compound is a substituted or unsubstituted normal or branched $C_1$ to $C_{36}$ alkylene radical.

6. A composition as defined in claim 1 wherein the organic radical R of said polysilyl compound is a substituted or unsubstituted $C_5$ to $C_{12}$ cycloalkylene radical.

7. A composition as defined in claim 1 wherein the organic radical R of said polysilyl compound is a substituted or unsubstituted $C_6$ to $C_{14}$ arylene radical.

8. A composition as defined in claim 1 wherein the organic radical R of said polysilyl compound is a substituted or unsubstituted tri or tetra valent radical of a $C_3$ to $C_{36}$ normal or branched aliphatic hydrocarbon.

9. A composition as defined in claim 1 wherein the organic radical R of said polysilyl compound is a substituted or unsubstituted tri or tetra valent radical of a $C_6$ to $C_{14}$ cycloaliphatic or aromatic hydrocarbon.

10. A composition as defined in claim 1 wherein the organic radical R of said polysilyl compound is a substituted or unsubstituted hydrocarbyloxy radical of the formula $$-(OC_mH_{2m})_d-O-$$

wherein m is an integer having a value of 2 to 4, and d is an integer having a value of 1 to 50, wherein for each value of d, m may be the same or different.

11. A composition as defined in claim 1 wherein the organic radical R of said polysilyl compound is an amino radical of the formula:

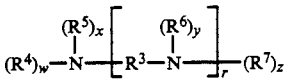

wherein $R^4$, $R^5$, $R^6$ and $R^7$ are selected from the group consisting of hydrogen, and monovalent substituted and unsubstituted organic radicals; $R^3$ is a bivalent hydrocarbon radical having 2 to 6 carbon atoms; w, x, y, and z are integers independently having values of 0 or 1, and r is an integer from 0 to 50, inclusive, with the proviso that the combination of r, w, x, y and z provides the polysilyl compound defined thereby with 2 to 4 groups of the formula $$-(C_nH_{2n})_bSi-(R^2)_{3-c}\overset{(R^1)}{|}$$

as previously defined.

12. A composition as defined in claim 1 wherein the organic radical R of said polysilyl compound is an isocyanurate radical of the formula:

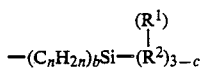

13. A composition as defined in claim 10 or claim 11 or claim 12 wherein each b has a value of 1 and each n is at least 2.

14. A composition as defined in claim 1 wherein:
(a) R is selected from the group consisting of:
—$CH_2$—, —$CH_2CH_2$—, —$CH(CH_3)$—, —$CH_2CH_2CH_2$—, —$CH_2CH(CH_3)$—, —$(CH_2)_4$—, —$CH_2CH_2CH(CH_3)$—, —$CH_2CH(C_2H_5)$—, —$CH_2CH_2CH(CH_3)CH_2$—, —$CH_2CH_2C(CH_3)_2$—, —$(CH_2)_{18}$—, —$(CH_2)_{16}CH(CH_3)$—,

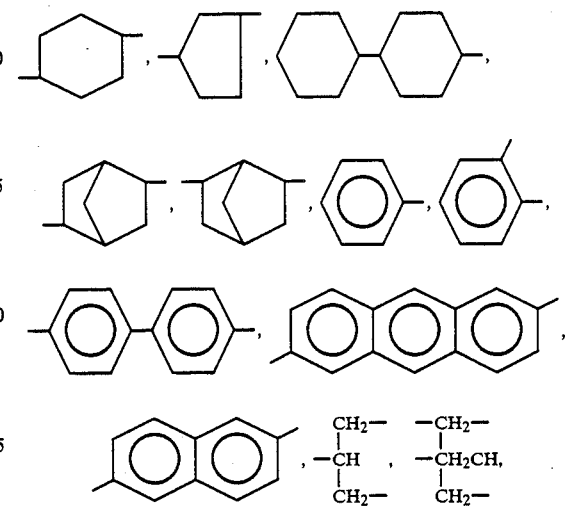

-continued

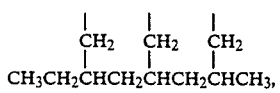
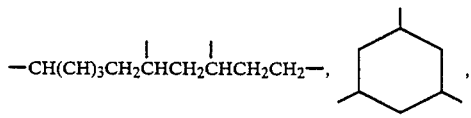
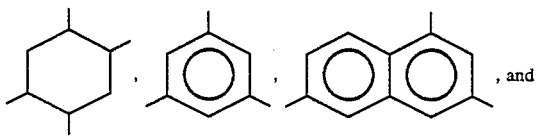, and
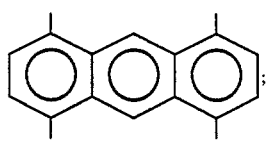

(b) R$^1$ is selected from the group consisting of hydrogen, monovalent hydrocarbon radicals and substituted monovalent hydrocarbon radicals;

(c) R$^2$ is a monovalent moiety hydrolyzable to a hydroxyl group and selected from the group consisting of acyloxy-containing species, alkyloxy-containing species, aryloxy-containing species, aralkyloxy-containing species, alkaryloxy-containing species, alkyleneoxy-containing species, hydroxy alkyloxy-containing species, hydroxy polyalkyleneoxy alkyloxy-containing species, alkoxy polyalkyleneoxy alkyloxy-containing species, acyloxy polyalkyleneoxy alkyloxy-containing species, alkoxy alkyloxy-containing species, acyloxy alkyloxy-containing species, cyano alkyloxy-containing species, cyano polyalkyleneoxy alkyloxy-containing species, amino alkyloxy-containing species, dialkylamino alkyloxy-containing species, alkanolamino alkyloxy-containing species, dialkanolamino alkyloxy-containing species, carboxy alkyloxy-containing species, carboxy polyalkyleneoxy alkyloxy-containing species, carboalkoxy-containing species and carboalkoxy alkyloxy-containing species.

* * * * *